Aug. 18, 1964 A. ZEISMER 3,144,742
COTTON GLEANER
Filed Oct. 23, 1961 5 Sheets-Sheet 1

ARTHUR ZEISMER
INVENTOR
HUEBNER & WORREL
ATTORNEYS
BY
Richard M. Worrel

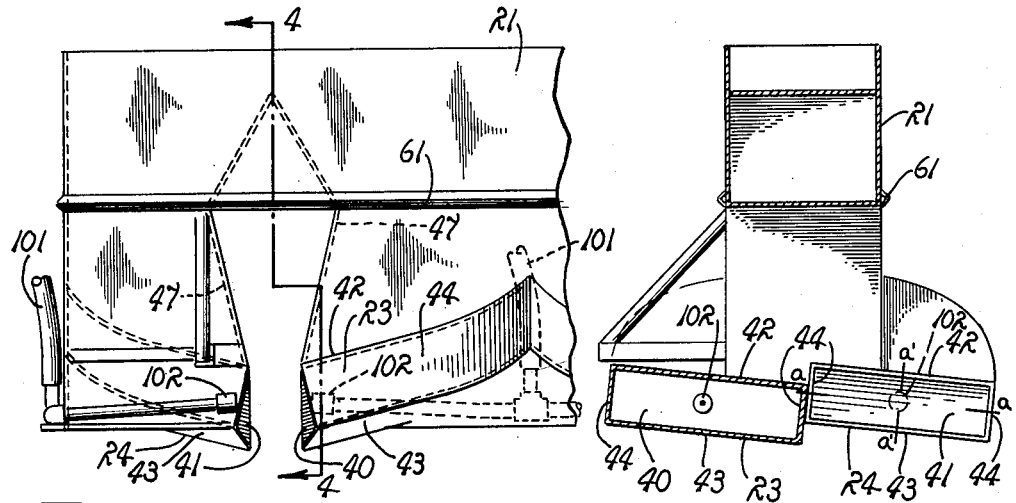
FIG. 3.
FIG. 4.
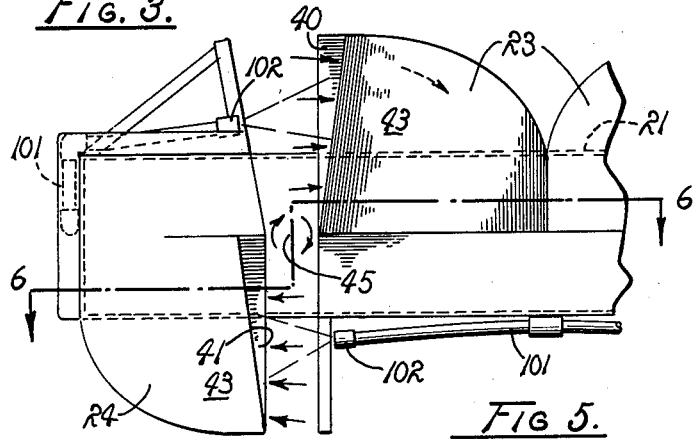
FIG 5.
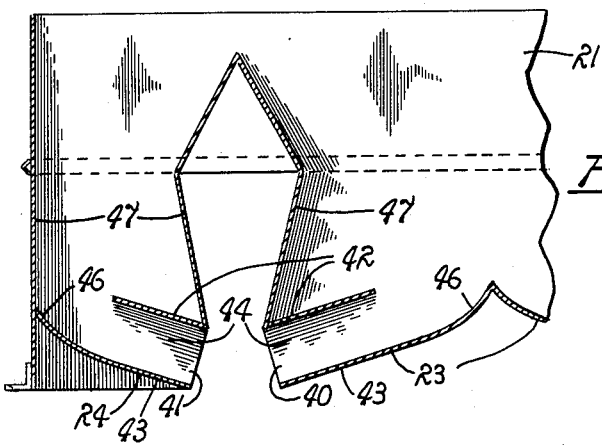
FIG. 6.
ARTHUR ZEISMER
INVENTOR
HUEBNER & WORREL
ATTORNEYS

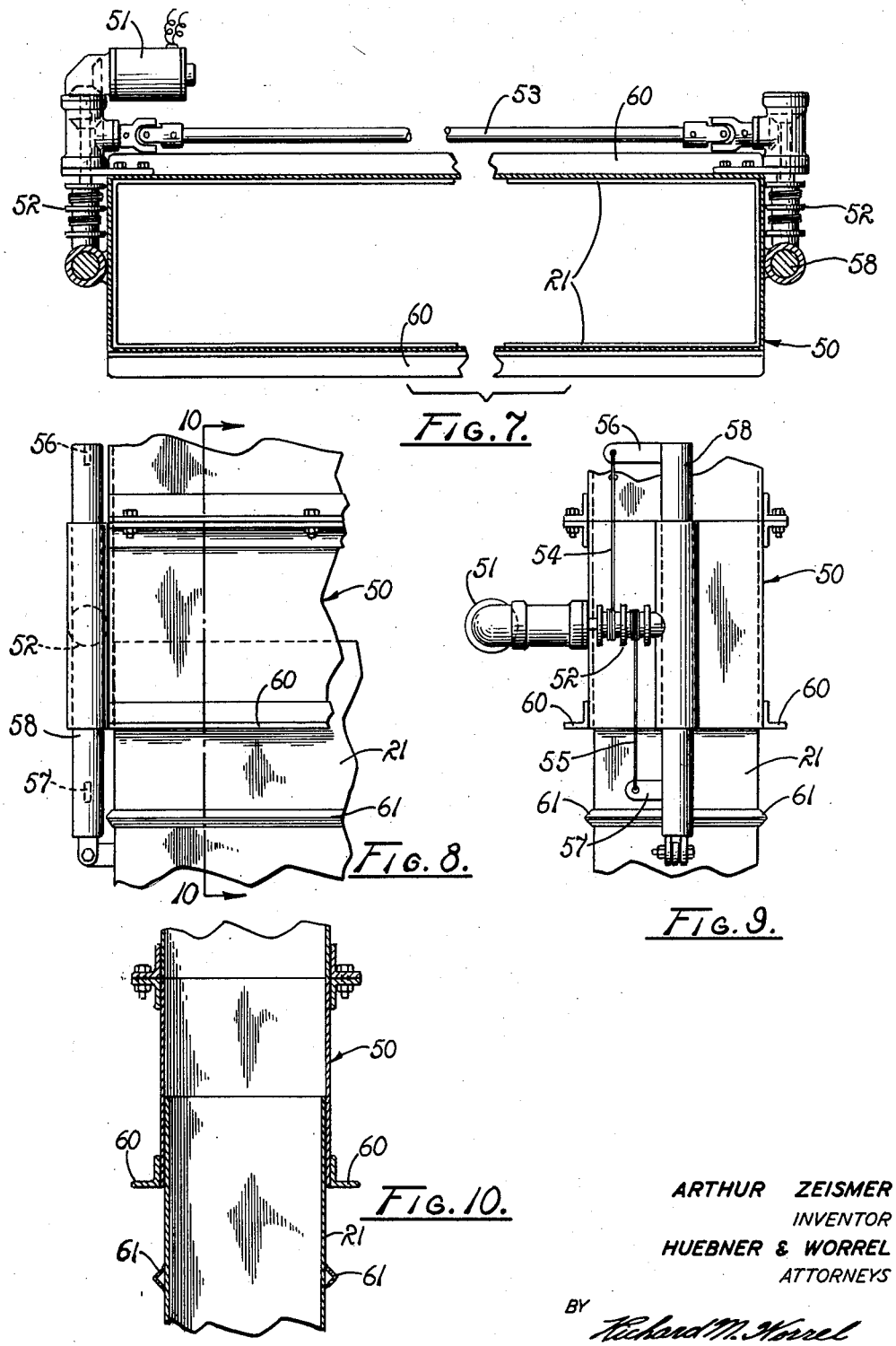

Aug. 18, 1964

A. ZEISMER 3,144,742

COTTON GLEANER

Filed Oct. 23, 1961

ARTHUR ZEISMER
INVENTOR

HUEBNER & WORREL
ATTORNEYS

BY
Richard M. Worrel

Aug. 18, 1964          A. ZEISMER          3,144,742
                       COTTON GLEANER
Filed Oct. 23, 1961                        5 Sheets-Sheet 5

ARTHUR ZEISMER
INVENTOR
HUEBNER & WORREL
ATTORNEYS
BY Richard M. Worrel

United States Patent Office 3,144,742
Patented Aug. 18, 1964

3,144,742
COTTON GLEANER
Arthur Zeismer, 630 N. Irwin, Hanford, Calif.
Filed Oct. 23, 1961, Ser. No. 146,856
8 Claims. (Cl. 56—12)

This invention relates generally to a self-propelled apparatus for gleaning cotton from fields, gin yards, roadways and the like and particularly fields of cotton which previously have been picked by a conventional mechanical cotton picker. The apparatus is a pneumatic type of gleaner which accelerates the cotton in a horizontal direction as it lifts the cotton from the supporting ground and the cotton stalks. The invention also relates to a cleaning mechanism for a pneumatic gleaner wherein the cotton and a certain quantity of foreign material is entrained in the air stream employed to glean and to convey the cotton to a receptacle.

It has been recognized that a certain portion of a cotton crop is left in a field following the harvesting of that field by the use of a conventional cotton picker. Several types of gleaners have been utilized, some of which employ mechanical means to pick the cotton from the ground and the lower branches of the cotton stalks, whereas others of a pneumatic type employ one or more suction heads in which the cotton is lifted vertically from the supporting surface by means of a high velocity air stream.

Those gleaners of the pneumatic type employing a vertically directed air stream normally cause a great quantity of dirt, cotton stalks, and other trash or foreign material to become intermixed with the cotton. In some cases the trash is so intermixed with the cotton that subsequent cleaning and ginning of the cotton is impossible; in most cases, the required cleaning renders the entire gleaning process uneconomic and the resultant cotton is of poor grade.

Accordingly, it is the principal object of the present invention to provide a pneumatic cotton gleaner which effectively harvests cotton left in the field by conventional pickers and from other locations where it is normally wasted.

Another object is to provide a pneumatic cotton gleaner which entrains a minimum amount of dirt, trash, and other foreign material in the conveying air stream during the gleaning operation.

Another object is to provide a self-propelled cotton gleaning machine which can be efficiently operated by one man.

Another object is to provide a pneumatic type cotton gleaner which requires a minimum air flow through the gleaning head to lift the cotton from the ground traversed by the machine.

Another object is to provide an adjustable gleaning head for a cotton harvester which can be readily positioned at an optimum elevation with respect to the surface of the ground.

Another object is to provide a pneumatic cotton gleaner wtih a mechanical separator which eliminates a major portion of any trash entrained in the air stream employed to elevate and to convey the cotton from the field to a receptacle provided on the gleaner.

A further object is to provide a separator mechanism for a pneumatic cotton gleaner which includes apparatus to reduce the particle size of any rigid portions of cotton stalks and other trash intermixed with the cotton elevated from the field, so that a subsequent ginning of the cotton is economically feasible.

These, together with other objects, will become more fully apparent upon reference to the following description and accompanying drawings.

In the drawings:

FIG. 3 is a fragmentary, front elevational view, slightly enlarged, showing one of the gleaning heads of the apparatus.

FIG. 4 is a vertical, longitudinal section taken on line 4—4 of FIG. 3.

FIG. 5 is a bottom plan view of the gleaning head shown in FIG. 3.

FIG. 6 is a vertical transverse section taken on line 6—6 of FIG. 5.

FIG. 7 is an enlarged fragmentary, horizontal, transverse section taken on line 7—7 of FIG. 2.

FIG. 8 is a portion of the conveying duct of one of the gleaning heads shown in FIG. 2, somewhat enlarged and fragmentarily shown.

FIG. 9 is a side elevational view of apparatus shown in FIG. 8.

FIG. 10 is a vertical, longitudinal section taken on line 10—10 of FIG. 8.

Figure 1:
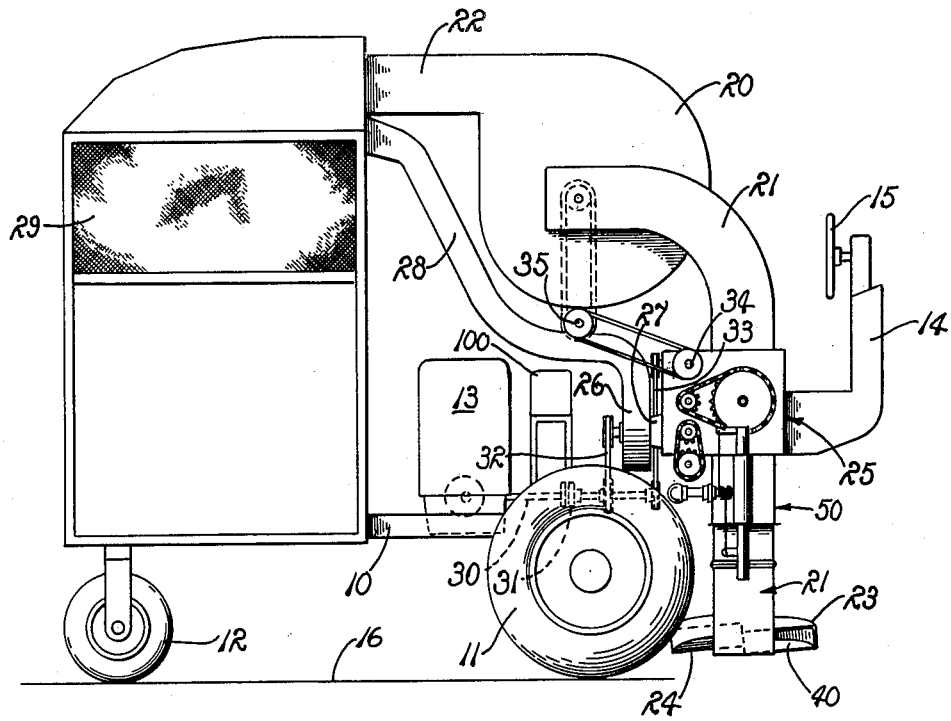
FIG. 1 is a side elevation of a cotton gleaner embodying the principles of the present invention, portions of the power train and associated components being shown in dashed lines.
Figure 2:
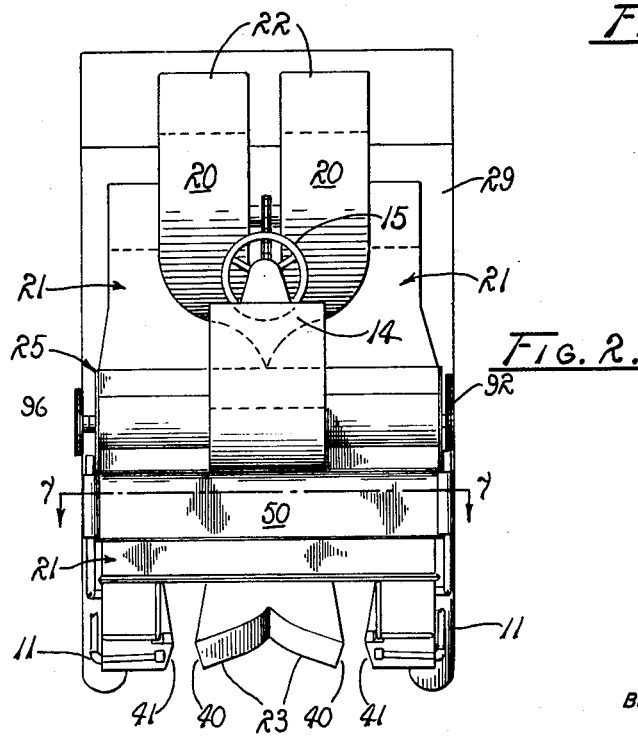
FIG. 2 is a front elevation of the gleaner shown in FIG. 1.

As illustrated in FIGURE 1, the cotton gleaner embodying the principles of the present invention includes a vehicle formed by a main frame 10 supported on a pair of laterally opposed forward drive wheels, one of which is shown at 11 and a trailing steerable wheel 12. The transverse spacing of the wheels so forming a tricycle support is such to permit the gleaning of two adjacent rows of cotton. An internal combustion engine 13, or other prime mover as a suitable source of power, is mounted on the frame and used to propel the vehicle and to drive other components subsequently to be described. A conventional power train, not shown, is provided between the engine and the drive wheels selectively to transmit power thereto.

An operator station 14 projects forwardly of the machine and includes a steering wheel 15 and other controls (of conventional design and not specifically designated) necessary for timely operation of the propelling power train and other components of the machine. The entire unit is designed to be self-propelled as it traverses the surface of the ground 16 in a direction from left to right as viewed in FIGURE 1 to glean that area of a cotton field in which two adjacent rows of cotton stalks are located. It will, however, be apparent that the gleaner of the instant invention may be borne by any suitable mobile vehicle whether self-propelled or not.

A pair of primary blowers 20 is supported on the frame 10 each of which is provided with respective suction, or inlet, ducts 21 and pressure, or discharge, ducts 22. The inlet ducts are secured to the blowers at an axial location, and a conventional centrifugal rotor, the details of which are not shown, is employed to drive an air stream through the inlet duct and out the discharge duct. Each inlet duct 21 projects forwardly and is curved downwardly in a depending manner and terminates in a branched conduit providing respective forward and rearward gleaning heads 23 and 24. The gleaning heads are laterally opposed in longitudinally spaced relationship. Interposed the gleaning heads and the blowers is a mechanical cleaner 25, the details of which will be described below. A secondary blower 26 is located at the rear of the cleaner and provided with an inlet duct 27 in communication with the cleaner and a discharge duct 28. A perforate receptacle 29 is mounted on the frame and adapted to receive the discharge flow from the discharge ducts 22 and 28 leading from the primary and secondary blowers.

The power train for the blowers includes a main power take-off shaft 30 which is driven by the engine 13 through a suitable power take-off clutch and drive mechanism generally indicated at 31. Power from the shaft 30 is transmitted to the secondary blower 26 by means of a transfer drive indicated at 32. The power take-off shaft 30 also powers a cross drive 33 which in turn, through conventional power transmission apparatus, drives a jack shaft 34. An upper transfer drive generally indicated at 35 completes the power train from the engine to the primary blowers 20.

The details of the cotton gleaning heads and their relative locations are clearly shown in FIGS. 3 through 6. Each of the forward and rearward heads 23 and 24 is provided with respective entry ports 40 and 41 of a generally rectangular configuration. Each entry port is defined by upper and lower walls 42 and 43 and end walls 44. As can be seen in the aforementioned figures, each pair of gleaning heads is laterally opposed and adapted to straddle a single row of cotton; in addition, they are spaced longitudinally so that their respective adjacent end walls are in close proximity to each other. When so disposed, and with the primary blower in operation, the respective air streams entering the gleaning heads of an opposed pair causes a cyclonic flow of air in the area indicated at 45; however, the major portion of the air entering one of the heads is not opposed by the air entering the other head. The cyclonic flow is effective to dislodge cotton particles from the stalks and the ground.

The entry port of each gleaning head has a major axis a—a longer than its minor axis a'—a'. The major axis is disposed at a slight angular inclination with respect to the surface of the ground over which the machine is traveled, so that the stream of air entering each gleaning head will cover a maximum effective area without increasing the dimensions of the gleaning head. Since the air flow through the gleaning head required to provide a sufficient velocity effectively to lift the cotton from the ground is directly related to the size of entry in the gleaning head, it is desirable that the entry be maintained at a minimum size. By inclining the major axis, an entry port of a smaller size and requiring less air flow can efficiently cover the same area of a larger entry port requiring greater total air flow.

The lower walls of each entry port are inclined transversely upwardly as at 46 and joined with side walls 47 of the inlet ducts 21. The branched conduit so formed by the side walls of the gleaning heads are of a greater cross-sectional dimension than the entry port of such heads, so that the velocity of the air stream flowing therethrough can be decreased to a satisfactory conveying velocity. Since the cotton must be accelerated from a zero initial velocity as it is resting on the ground or entangled with a cotton stalk, the velocity of the air entering the gleaning head must be considerably higher than the velocity required to convey the cotton through the duct 21. An accepted conveying velocity for cotton is two thousand feet per minute. Since the vertical lifting velocity required to accelerate the cotton from a static condition is greater than the horizontal transporting velocity, it is advantageous to design the entry port and circumscribing walls of the gleaning head so that a generally horizontal air flow is created over the surface of the cotton field to be gleaned. When the gleaning head is so designed, a larger entry port can be provided with the same total air flow at a lower velocity than that required with a pneumatic gleaner employing a generally vertically directed air stream. Also, with a lower velocity of the air utilized to accelerate the cotton in a generally horizontal direction, fewer particles of dirt, cotton stalks, and other foreign material become entrained in the air stream.

Elevational control of the gleaning heads is provided by a telescopic section 50 incorporated as a unit common to both of the inlet ducts 21. Extension and retraction of this telescopic section, which affords elevational control of the gleaning heads, is effected by a reversible motor 51 which drives a pair of winches 52 provided at opposite sides of the telescopic section. Power is transmitted from the motor to the winches by means of a cross-shaft 53, which includes suitable universal joints and right-angle drives interconnecting the cross-shaft and the winches. Oppositely wound on respective portions of each winch are upper and lower cables 54 and 55 secured to respective anchorages 56 and 57. The anchorages project from a rigid strut 58 secured to the movable portion of the inlet duct 21. Since the motor, cross-shaft, and winches are mounted on the immobile portion of the telescopic section, winding the winches in an appropriate direction effects either extension or retraction of the section. Upper and lower stops 60 and 61 limit the degree of such extension and retraction. A gauge shoe may be provided at the forward portion of one of the gleaning heads to provide a visible, as well as a mechanical, point of reference for elevation of the gleaning heads. The reversible motor is powered by a generator, not shown, driven by the engine 13, and suitable controls for the motor, also not shown, are located at the operator's station 14.

Figure 13:
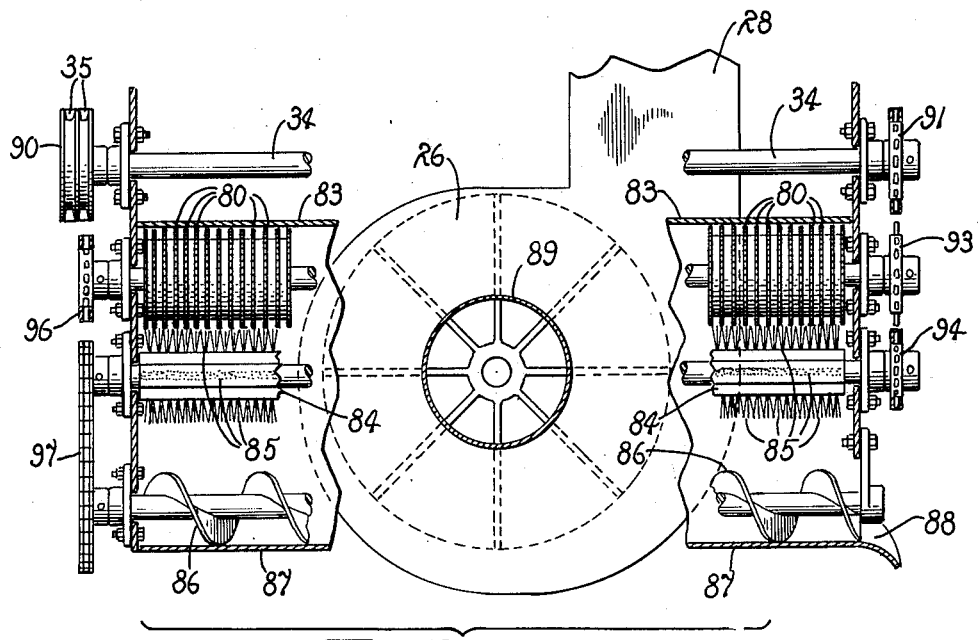
FIG. 13 is a vertical, transverse section taken on line 13—13 of FIG. 11.
Figure 14:
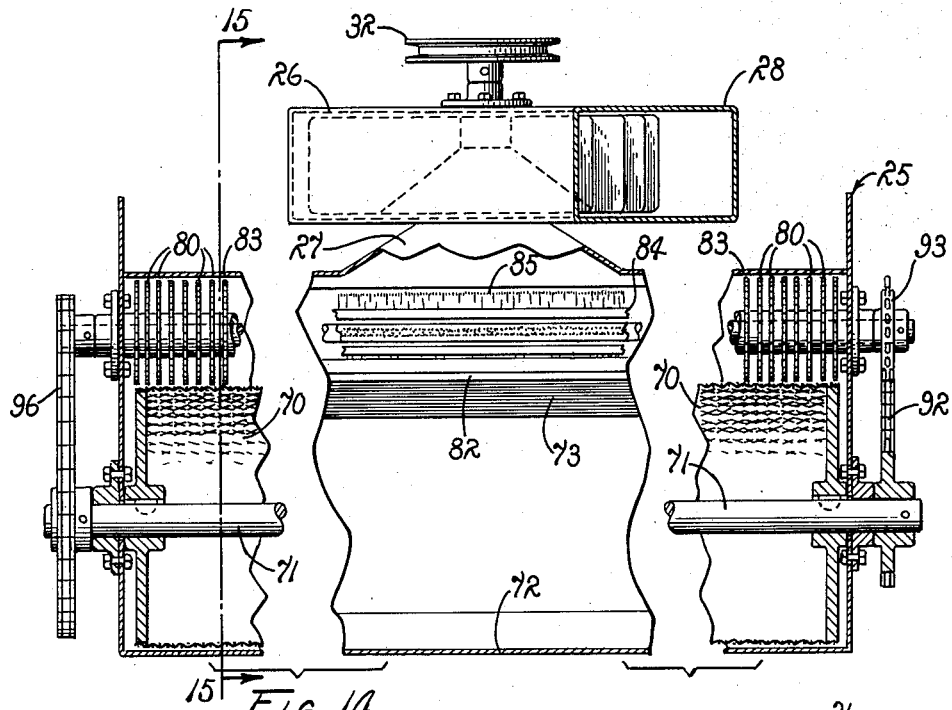
FIG. 14 is a horizontal, transverse section taken on line 14—14 of FIG. 11, with portions broken away for illustrative convenience.
Figure 15:
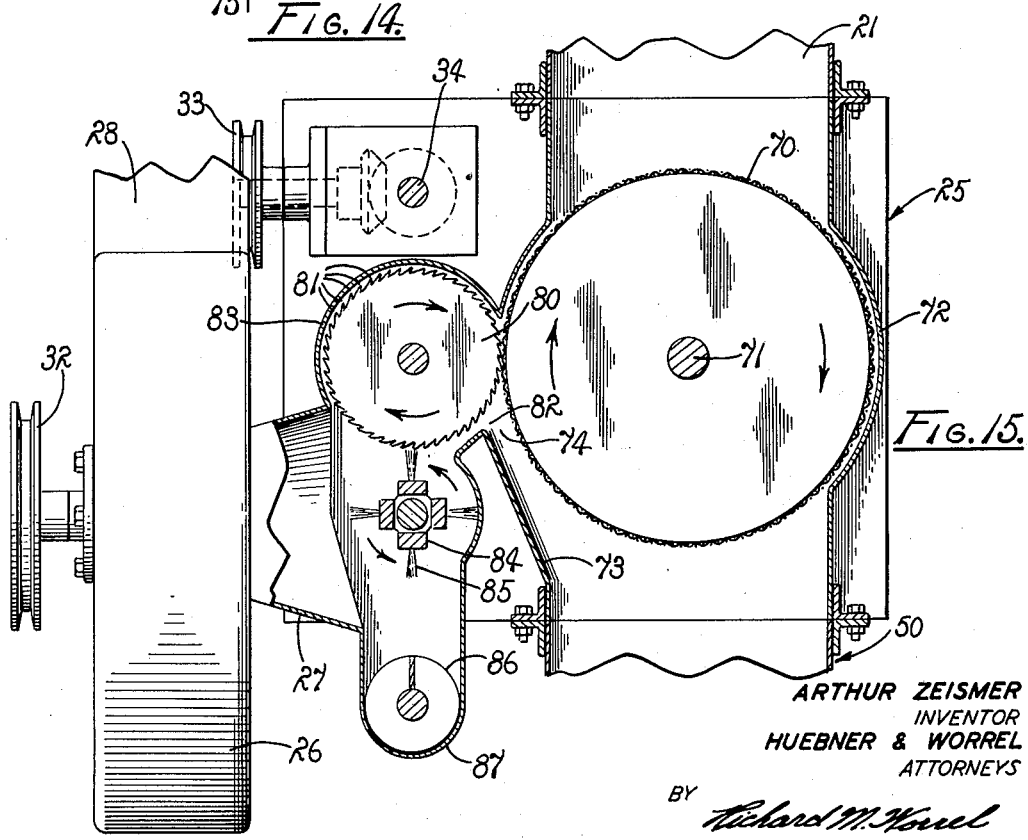
FIG. 15 is a vertical, longitudinal section taken through the mechanical separator section taken on a plane indicated by the line 15—15 of FIG. 14.

As shown in FIGS. 13, 14, and 15, the mechanical separator 25 comprises a perforate rotor 70 supported on a shaft 71 mounted for rotation within an enlarged portion of the joined inlet ducts 21 and constitutes a chamber partially defined by a curved side wall 72 closely adjacent to the periphery of the rotor. As can be seen in FIGURE 15, the opposite side wall 73 of the chamber converges toward the periphery of the rotor to define a constricted throat 74 through which the cotton and any foreign material intermixed therewith must pass. As such, the constricted throat within the chamber defined by the side wall 72, 73 and the opposing end walls of the ducts 21 constitutes a first cleaning station for the conveying air stream. The perforate rotor is powered for rotation in a clockwise direction, as viewed in FIG. 15.

Disposed parallel to the rotor is a doffing saw 80 also powered for clockwise rotation, as viewed. The doffing saw is provided with peripheral teeth 81 inclined in the direction of rotation. The saw is mounted in close proximity to the rotor so that the adjacent portions of their respective peripheries define a constriction of a dimension less than the mean diametrical proportion of the foreign material, such as large, irregularly shaped particles of cotton stalks and other trash, anticipated to be entrained in the air stream. Disposed upstream from the adjacent peripheries is a rigid reaction bar 82 immediately adjacent to the constricted throat and spaced from the periphery of the saw a sufficient distance to permit broken particles of dirt, cotton stalks, and other foreign material, having predetermined maximum dimensions, to pass between the bar and the saw. The major portion of the periphery of the saw is enclosed within a housing 83 of a configuration conforming to the cylindrical shape of the saw.

Mounted beneath the saw is a cleaning brush 84, powered for rotation in a counterclockwise direction (as viewed in FIG. 15) and at an angular velocity such that the cleaning brush has a relative peripheral speed greater than that of the doffing saw 80. The brush is provided with radially extending bristles 85 and mounted in proximity to the saw so that the ends of the bristles brush the periphery of the saw in a manner to clean the teeth of any cotton fibers enmeshed therein.

The housing 83 is extended downwardly and includes a lower portion adapted rotatably to support therein a screw-type conveyor 86. The conveyor effects transverse movement of any debris, of a density greater than the cotton, dropping into a trough 87 in the lower portion of the housing. The conveyor moves such debris axially toward a discharge opening 88 provided in the side of the housing. The housing 83 is also provided with an outlet 89 communicating with the inlet 27 of the secondary blower 26.

Figures 11, 12:
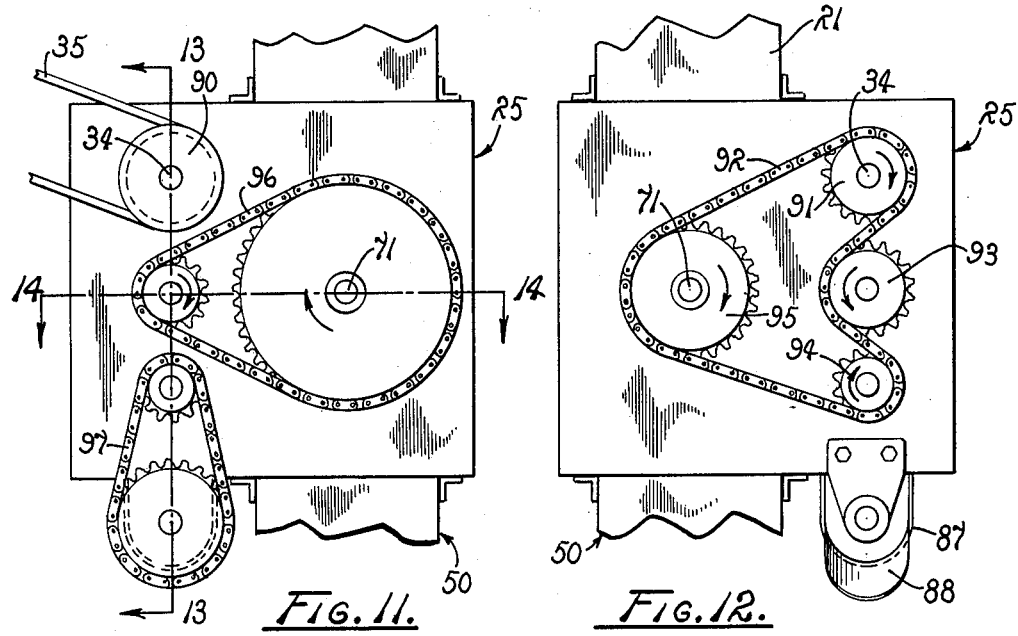
FIG. 11 is a fragmentary, enlarged view in side elevation of the power train shown in FIG. 1, portions of the housing normally enclosing the power train not being shown for purposes of clarity.
FIG. 12 is similar to FIG. 11, but showing the power train at the opposite side of the machine.

The power transmission for the mechanical separator is shown in FIGURES 11, 12 and 13 and includes a sprocket 90 at the right hand end, viewed from the operator's station 14, of the jack shaft 34. The sprocket 90 transmits power to the upper drive 35 to rotate the primary blowers 20.

A sprocket 91, at the left end of the jack shaft, transmits power by means of a drive chain 92 trained over a driving sprocket 93 for the doffing saw, a drive sprocket 94 for the cleaning brush, and an idler sprocket 95 rotatably mounted at the end of the rotor shaft 71. At the opposite end of the rotor shaft, a speed reducing drive 96 transfers power from the doffing saw shaft to the perforate rotor. A similar transfer drive 97 is employed to rotate the screw conveyor 86.

During certain operating conditions, such as a high moisture content of the cotton bolls to be gleaned, it has been found to be advantageous to employ a high velocity jet of air to dislodge any such bolls and any other cotton particles from the cotton stalks. To provide such high velocity jets of air, a compressor 100 is mounted on the frame and driven by the engine by suitable power transmission means, now shown. By means of suitable supply lines, portions of which are shown at 101, air under high pressure is conducted from the compressor to discharges nozzles 102 mounted slightly above, laterally opposed to, and generally longitudinally aligned with each entry port of the picking heads. When so disposed, the discharge nozzles direct a jet of high velocity air effective to dislodge many cotton bolls and particles which otherwise would not be gleaned by a pneumatic gleaner.

*Operation*

The operation of the described embodiment of the subject invention is believed to be readily apparent and is briefly summarized at this point. The engine 13 is started and the power train to the drive wheels engaged to motivate the cotton gleaner through a field to be gleaned. At the same time the power take-off clutch is engaged to drive the power tak-off shaft 30, and consequently the primary and secondary blowers 20 and 26 and the drive mechanism for the mechanical separator 25. If the moisture content of the cotton bolls is such that it is advantageous to employ the high velocity jets of air from the discharge nozzles 102, the drive for the compressors 100 is also engaged so that an adequate supply of air is available. The gleaning heads 23 and 24 are then elevationally adjusted by means of the reversible motor 51 to effect consequent extension or retraction of the telescopic section 50. Since the mating components of the telescopic section must be closely fitted to prevent a loss of suction at the entry ports of the gleaning heads, the reversely wound cables 54 and 55 are provided on the winches so that the gleaning heads can be power raised and power lowered, thereby overcoming frictional resistance to movement and resulting in prompt elevational adjustment.

As the gleaner progresses through the field, the laterally opposed, longitudinally spaced entry ports of the gleaning heads direct the air entering the ports in a generally horizontal direction with a slight vertical component. With the air so directed, the velocity of the air required to accelerate the cotton bolls is less than that required if the cotton were to be lifted vertically from a resting position. Accordingly, with a lower air velocity, fewer particles of dirt, cotton stalks and other foreign material, particularly the foreign material of higher specific gravity, are admitted to the air stream conveying the cotton through the ducts 21.

The conveying air stream, along with the cotton and minor portions of foreign material inevitably entrained therein, is directed to the mechanical separator 25. The major portion of the air stream passes through the perforate rotor 70, while a minor portion flows through the constricted throat 74 and ultimately enters the secondary blower 26. As each particle of cotton, entrained in the air stream, strikes the perforate rotor, its direction of travel is changed from rectilinear to curvilinear. The resulting accelerating flattens the cotton against the periphery of the rotor to reduce the diametrical proportions of the cotton particle so that a major portion of the cotton particles pass between the adjacent peripheries of the rotor and the doffing saw. Upon reaching a point approximately one-hundred eighty degrees from the point of initial contact of the rotor, the air stream flowing therethrough lifts each particle of cotton from the rotor periphery and conveys it through the upper portion of the ducts 21 subsequently to be discharged from the ducts 22 into the receptacle 29.

Semi-rigid and brittle particles of foreign material entrained in the air stream having dimensions greater than the spacing between the adjacent peripheries of the rotor and the saw, are picked up by the saw teeth and forced between the restricted space between the periphery of the saw and the rigid bar 82. Consequently, as these particles are forced between this restricted space and strike the bar, the large particles are reduced to a size which is acceptable in subsequent cotton ginning operations. These particles being of a denser material than the cotton particles, and of a much smaller mean diametrical dimension so that considerably less supporting area is presented to the air stream, gravitate toward the bottom of the housing 83 into the trough 87, subsequently to be discharged by the screw conveyor 86 through the opening 88. Cotton particles picked up by the doffing saw are brushed therefrom by the cleaning brush 84 and ejected through the outlet 89 into the inlet 27 of secondary blower 26. The secondary blower then provides a stream of air having a sufficient velocity to convey the cotton to the receptacle 29.

The exhaust ducts 22 and 28 of the primary and secondary blowers direct the conveying air stream into the receptacle 29. The receptacle preferably is of a perforate construction to permit the escape of the conveying air while separating the cotton therefrom. Suitable filtering apparatus may also be employed if desired, or found necessary to accommodate the total volume of air being discharged into the receptacle.

It can be seen that a self-propelled machine is provided which efficiently gleans cotton which normally would be left in the field or other environment by conventional pickers. The machine includes a pneumatic conveying system and provides laterally opposed gleaning heads which effectively pick up the cotton particles while entraining a minimum of foreign matter in the air stream employed as a vehicle in the system. Also provided in the machine is a mechanical separator to divide foreign material entrained in the conveying air stream as well as reducing the particle size of any cotton stalks and other rigid particles, so that the cotton gleaned by the machine is adaptable for subsequent ginning. The machine also provides a telescopic section in the inlet ducts for the gleaning heads which are immediately responsive to control signals, so that the gleaning heads can be operated at all times at an optimum elevation.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A gleaner for cotton fields comprising a vehicle; a prime mover mounted thereon; a blower mounted in the vehicle driven by the prime mover; duct means providing an inlet and an outlet to and from the blower, said inlet depending from the vehicle; and a pair of laterally opposed, longitudinally spaced gleaner heads extended from and in pneumatic communication with the inlet duct, each of the gleaner heads having walls defining an entry port disposed to direct an air stream entering through the port in a substantially horizontal direction.

2. The gleaner of claim 1 wherein each of the entry ports is of oblong form having a major axis inclined with respect to the surface of the field.

3. The gleaner of claim 1 wherein a source of air under pressure is carried on the vehicle, and conduit means are provided on the inlet end of said duct means to direct a jet of air toward each of the entry ports.

4. A cotton gleaner comprising a vehicle having a prime mover as a source of power; a pair of gleaner heads having laterally opposed, entry ports spaced longitudinally of the vehicle; a receptacle for the cotton; duct means interconnecting the gleaner heads and the receptacle; a blower driven by the prime mover and in pneumatic communication with the duct means whereby a stream of air enters the gleaner heads in a substantially horizontal direction and conveys cotton particles and particles of foreign material having a density greater than the cotton particles; and mechanical separator means mounted in the vehicle adapted to remove said foreign material from the conveying air stream.

5. A gleaner comprising a mobile vehicle having forward and rearward end portions; a gleaner head mounted on the vehicles adjacent to the ground, said head having a pair of substantially horizontally disposed inlet ports located on opposite sides of a line longitudinally of the vehicle, facing said line, and spaced longitudinally of the vehicle along said line; and means borne by the vehicle connected to the gleaner head adapted to draw air and air-borne materials into the inlet ports, the longitudinal spacing of said ports in relation to the velocity of air drawn into the ports being such as to cause a swirling of air between the ports to dislodge material disposed on the ground between the ports.

6. A cotton gleaner comprising a mobile vehicle having a predetermined direction of movement; a blower having an intake and an exhaust mounted on the vehicle; a bifurcated duct connected to the intake of the blower and having a pair of inlet ports, said ports being substantially horizontally disposed, located on opposite sides of a plane extended longitudinally of the direction of movement of the vehicle, facing said plane adjacent to the ground, and spaced from each other longitudinally of the direction of movement of the vehicle; and means connected to the exhaust of the blower adapted to receive cotton in air stream from the blower drawn in through the inlet ports of the duct.

7. The gleaner of claim 6 in which the longitudinal spacing of the ports is such that the air drawn inwardly of the ports causes a swirling of air between the ports to dislodge cotton entangled with obstructions between the ports.

8. The gleaner of claim 6 including nozzles mounted in substantially horizontal spaced alignment with the ports; and means for projecting air streams through the nozzles toward the ports.

References Cited in the file of this patent
UNITED STATES PATENTS

| | | |
|---|---|---|
| 2,699,637 | Nisbet | Jan. 18, 1955 |
| 2,716,856 | Burns | Sept. 6, 1955 |
| 2,990,585 | Sawyer | July 4, 1961 |
| 3,010,159 | Roberson et al. | Nov. 28, 1961 |